US012505680B2

(12) United States Patent
Lee et al.

(10) Patent No.: US 12,505,680 B2
(45) Date of Patent: Dec. 23, 2025

(54) TRAFFIC LIGHT RECOGNITION MODEL LEARNING AND INFERENCE METHOD AND SYSTEM

(71) Applicant: Electronics and Telecommunications Research Institute, Daejeon (KR)

(72) Inventors: Dong-Jin Lee, Daejeon (KR); Jungyu Kang, Daejeon (KR); Kyoung-Wook Min, Daejeon (KR); Jeong Dan Choi, Daejeon (KR); Seung Jun Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 412 days.

(21) Appl. No.: 18/073,111

(22) Filed: Dec. 1, 2022

(65) Prior Publication Data

US 2023/0177845 A1   Jun. 8, 2023

(30) Foreign Application Priority Data

Dec. 7, 2021  (KR) .................. 10-2021-0173942
Apr. 7, 2022  (KR) .................. 10-2022-0043326

(51) Int. Cl.
*G06V 20/58* (2022.01)
*G06T 7/70* (2017.01)
(Continued)

(52) U.S. Cl.
CPC ............. *G06V 20/584* (2022.01); *G06T 7/70* (2017.01); *G06V 10/774* (2022.01); *G06V 20/70* (2022.01);
(Continued)

(58) Field of Classification Search
CPC ...... G06V 20/58; G06V 20/584; G06V 20/70; G06V 10/95; G06V 10/774; G06V 10/58;
(Continued)

(56) References Cited

U.S. PATENT DOCUMENTS 8,620,032 B2 *  12/2013  Zeng ................ G08G 1/09623
                                                382/104
9,990,548 B2 *   6/2018  Wellington ............ G06V 20/56
(Continued)

FOREIGN PATENT DOCUMENTS

KR       10-1877809        7/2018
KR    10-2020-0101509      8/2020
(Continued)

OTHER PUBLICATIONS

D. Zhou er al., IoU Loss for 2D/3D Object Detection, 2019, https://arxiv.org/abs/1908.03851 (Year: 2019).*
(Continued)

*Primary Examiner* — Chan S Park
*Assistant Examiner* — Paulo Andres Garcia
(74) *Attorney, Agent, or Firm* — KILE PARK REED & HOUTTEMAN PLLC

(57) ABSTRACT

Disclosed is a system for executing a traffic light recognition model learning and inference method, includes a data collection platform including a camera for collecting image data, and a first processor that samples traffic light image data including a traffic light among the image data, generates annotation data based on the traffic light image data, and generates a traffic light data set using the traffic light image data and the annotation data, wherein the traffic light data set includes information on a location of the traffic light, a type of the traffic light, traffic light on/off, and a traffic signal direction of the traffic light.

20 Claims, 9 Drawing Sheets

(51) Int. Cl.
  *G06V 10/774* (2022.01)
  *G06V 20/70* (2022.01)
(52) U.S. Cl.
  CPC .............. *G06T 2207/20076* (2013.01); *G06T 2207/20081* (2013.01)
(58) Field of Classification Search
  CPC .............................. G06V 10/82; B60W 40/04; B60W 2420/408; B60W 2554/4046; G06T 7/70; G06T 7/77; G06T 2207/20076; G06T 2207/20081; G06T 2207/10016; G06T 2207/20084; G06T 2207/30252
  See application file for complete search history.

(56) References Cited

U.S. PATENT DOCUMENTS

| | | | |
|---|---|---|---|
| 10,467,487 | B1 | 11/2019 | Wang et al. |
| 11,056,005 | B2 | 7/2021 | Krivokon et al. |
| 11,070,639 | B2 | 7/2021 | Kim et al. |
| 2018/0129205 | A1 | 5/2018 | Choi et al. |
| 2018/0192059 | A1* | 7/2018 | Yang ........................ G01S 17/89 |
| 2018/0307925 | A1* | 10/2018 | Wisniowski ............... G06T 7/73 |
| 2019/0087673 | A1* | 3/2019 | Li ........................... G06N 3/084 |
| 2021/0027076 | A1* | 1/2021 | Hayashi ............... G06V 20/584 |
| 2021/0201057 | A1* | 7/2021 | Lin ........................... G06F 18/24 |
| 2021/0287023 | A1* | 9/2021 | Hotson ................. G05D 1/0088 |
| 2022/0114375 | A1* | 4/2022 | Chen ....................... G06N 3/08 |

FOREIGN PATENT DOCUMENTS

| | | |
|---|---|---|
| KR | 10-2178202 | 11/2020 |
| KR | 10-2021-0078532 | 6/2021 |

OTHER PUBLICATIONS

L. C. Possatti et al., "Traffic Light Recognition Using Deep Learning and Prior Maps for Autonomous Cars," 2019 International Joint Conference on Neural Networks (IJCNN), Budapest, Hungary, 2019, pp. 1-8, doi: 10.1109/IJCNN.2019.8851927. (Year: 2019).*
Kim H-K, Yoo K-Y, Park JH, Jung H-Y. Traffic Light Recognition Based on Binary Semantic Segmentation Network. Sensors. 2019; 19(7):1700. https://doi.org/10.3390/s19071700 (Year: 2019).*
L. Gou et al., "VATLD: A Visual Analytics System to Assess, Understand and Improve Traffic Light Detection," in IEEE Transactions on Visualization and Computer Graphics, vol. 27, No. 2, pp. 261-271, Feb. 2021, doi: 10.1109/TVCG.2020.3030350. (Year: 2021).*
J. Kim, H. Cho, M. Hwangbo, J. Choi, J. Canny and Y. P. Kwon, "Deep Traffic Light Detection for Self-driving Cars from a Large-scale Dataset," 2018 21st International Conference on Intelligent Transportation Systems (ITSC), Maui, HI, USA, 2018, pp. 280-285, doi: 10.1109/ITSC.2018.8569575. (Year: 2018).*
A. Fregin, J. Muller, U. Krebel and K. Dietmayer, "The DriveU Traffic Light Dataset: Introduction and Comparison with Existing Datasets," 2018 IEEE International Conference on Robotics and Automation (ICRA), Brisbane, QLD, Australia, 2018, pp. 3376-3383, doi: 10.1109/ICRA.2018.8460737. (Year: 2018).*
M. Bach, D. Stumper and K. Dietmayer, "Deep Convolutional Traffic Light Recognition for Automated Driving," 2018 21st International Conference on Intelligent Transportation Systems (ITSC), Maui, HI, USA, 2018, pp. 851-858, doi: 10.1109/ITSC.2018.8569522. (Year: 2018).*
Ge et al., "YOLOX: Exceeding YOLO Series in 2021", arXiv:2107.08430v2, Aug. 6, 2021, pp. 1-7.
Yeh, T.-W. et al. Traffic Light and Arrow Signal Recognition Based on a Unified Network. Applied Sciences 2021, 11 (17), 8066 (Aug. 31, 2021) https://doi.org/10.3390/app11178066.

* cited by examiner

TRAFFIC LIGHT RECOGNITION MODEL LEARNING AND INFERENCE METHOD AND SYSTEM

CROSS-REFERENCE TO RELATED APPLICATIONS

This application claims priority under 35 U.S.C. § 119 to Korean Patent Application Nos. 10-2021-0173942 filed on Dec. 7, 2021, and 10-2022-0043326 filed on Apr. 7, 2022, in the Korean Intellectual Property Office, the disclosures of which are incorporated by reference herein in their entireties.

BACKGROUND

Embodiments of the present disclosure described herein relate to a traffic light recognition model learning and inference method and system, and more particularly, relate to a traffic light recognition model learning and inference method and system, which learn traffic light recognition through a deep-learning model and infer traffic light recognition based on the learned deep-learning model.

One of essential technologies for autonomous vehicles to safely drive in urban areas is a traffic light recognition technology. When an autonomous vehicle drives autonomously in an urban environment, the autonomous vehicle needs to recognize not only vehicle traffic lights on a driving path, but also pedestrian and bicycle traffic lights. For example, the autonomous vehicle should reflect the results of recognizing not only vehicle traffic lights, but also pedestrian traffic lights and bicycle traffic lights, when planning a driving route to turn right at an intersection and pass through a crosswalk in the northeast direction.

However, since the types of traffic lights and signals installed on the driving route are diverse, there are difficulties in training the traffic light detection and recognition model using a single deep-learning model even when an autonomous driving data set is built based on the results of recognizing a vehicle traffic light, a pedestrian traffic light, and a bicycle traffic light.

SUMMARY

Embodiments of the present disclosure provide traffic light recognition model learning and inference method and system which construct a traffic light data set during autonomous driving, effectively train a deep-learning model using the traffic light data set, and infer traffic light recognition based on the trained deep-learning model.

According to an embodiment of the present disclosure, a traffic light recognition model learning and inference system includes a data collection platform including a camera for collecting image data, and a first processor that samples traffic light image data including a traffic light among the image data, generates annotation data based on the traffic light image data, and generates a traffic light data set using the traffic light image data and the annotation data, wherein the traffic light data set includes information on a location of the traffic light, a type of the traffic light, traffic light on/off, and a traffic signal direction of the traffic light.

In one embodiment, the traffic light recognition model learning and inference system may further include a second processor that receives the image data and the traffic light data set, performs learning to infer the location of the traffic light, the type of the traffic light, the traffic light on/off, the traffic signal direction of the traffic light based on the traffic light data set and a learning condition, and infers the location of the traffic light, the type of the traffic light, the traffic light on/off, the traffic signal direction of the traffic light based on the image data and a result of the learning.

In one embodiment, the learning condition may include at least one of a size of the image data, data augmentation, a learning rate, momentum, weight decay, schedule, epoch, a batch size, and an evaluation cycle.

In one embodiment, the learning condition may be changed according to a collection environment of the image data, a size of the traffic light data set, and performance of the camera.

In one embodiment, the performing of learning to infer the location of the traffic light may include recognizing the location of the traffic light indicated in the traffic light data set, predicting the location of the traffic light, and calculating an Intersection over Union (IOU) loss based on a result of the recognition and a result of the prediction.

In one embodiment, the performing of learning to infer the location of the traffic light, the type of the traffic light, the traffic light on/off, the traffic signal direction of the traffic light may include calculating an actual probability distribution for the location of the traffic light, the type of the traffic light, the traffic light on/off, the traffic signal direction of the traffic light, predicting a probability distribution for the location of the traffic light, the type of the traffic light, the traffic light on/off, the traffic signal direction of the traffic light, and calculating a Binary Cross Entropy (BCE) loss based on a result of calculation and a result of prediction.

In one embodiment, the performing of learning to infer the location of the traffic light, the type of the traffic light, the traffic light on/off, the traffic signal direction of the traffic light may include generating two or more traffic light status vectors based on information about the traffic light, the type of the traffic light, the traffic light on/off, the traffic signal direction of the traffic light, and each of the two or more traffic light status vectors may include bits indicating the type of the traffic light, the traffic light on/off, the traffic signal direction of the traffic light.

In one embodiment, the annotation data may be based on pieces of information being expressed in numeric vectors having different sizes.

In one embodiment, the traffic light data set may include a plurality of data sets including one annotation data per traffic light image data.

According to an embodiment of the present disclosure, a traffic light recognition model learning and inference method including a data collection platform and a first processor, includes collecting, by the data collection platform including a camera, image data, sampling, by the first processor, traffic light image data including a traffic light among the image data, generating, by the first processor, annotation data based on the traffic light image data, and generating, by the first processor, a traffic light data set by using the traffic light image data and the annotation data, wherein the traffic light data set includes information on a location of the traffic light, a type of the traffic light, whether the traffic light is turned on, and a traffic signal direction of the traffic light.

In one embodiment, the traffic light recognition model learning and inference method may further include receiving, by a second processor, the image data and the traffic light data set, and performing learning to infer the location of the traffic light, the type of the traffic light, the traffic light on/off, the traffic signal direction of the traffic light based on the traffic light data set and a learning condition, and performing, by the second processor, learning to infer the location of the traffic light, the type of the traffic light, the traffic light on/off, the traffic signal direction of the traffic light based on a result of the learning and the image data.

In one embodiment, the learning condition may include at least one of a size of the image data, data augmentation, a learning rate, momentum, weight decay, schedule, epoch, a batch size, and an evaluation cycle.

In one embodiment, the learning condition may be changed according to a collection environment of the image data, a size of the traffic light data set, and performance of the camera.

In one embodiment, the performing of learning to infer the location of the traffic light may include recognizing the location of the traffic light indicated in the traffic light data set, predicting the location of the traffic light, and calculating an Intersection Over Union (IOU) loss based on a result of the recognition and a result of the prediction.

In one embodiment, the performing of learning to infer the location of the traffic light, the type of the traffic light, the traffic light on/off, the traffic signal direction of the traffic light may include calculating an actual probability distribution for the location of the traffic light, the type of the traffic light, the traffic light on/off, the traffic signal direction of the traffic light, predicting a probability distribution for the location of the traffic light, the type of the traffic light, the traffic light on/off, the traffic signal direction of the traffic light, and calculating a Binary Cross Entropy (BCE) loss based on a result of calculation and a result of prediction.

In one embodiment, the performing of learning to infer the location of the traffic light, the type of the traffic light, the traffic light on/off, the traffic signal direction of the traffic light may include generating two or more traffic light status vectors based on information about the traffic light, the type of the traffic light, the traffic light on/off, the traffic signal direction of the traffic light, and each of the two or more traffic light status vectors may include bits indicating the type of the traffic light, the traffic light on/off, the traffic signal direction of the traffic light.

The annotation data may be based on pieces of information being expressed in numeric vectors having different sizes.

The traffic light data set may include a plurality of data sets including one annotation data per traffic light image data.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described clearly and in detail to the extent that those skilled in the art can easily practice the present disclosure.

Figure 1:
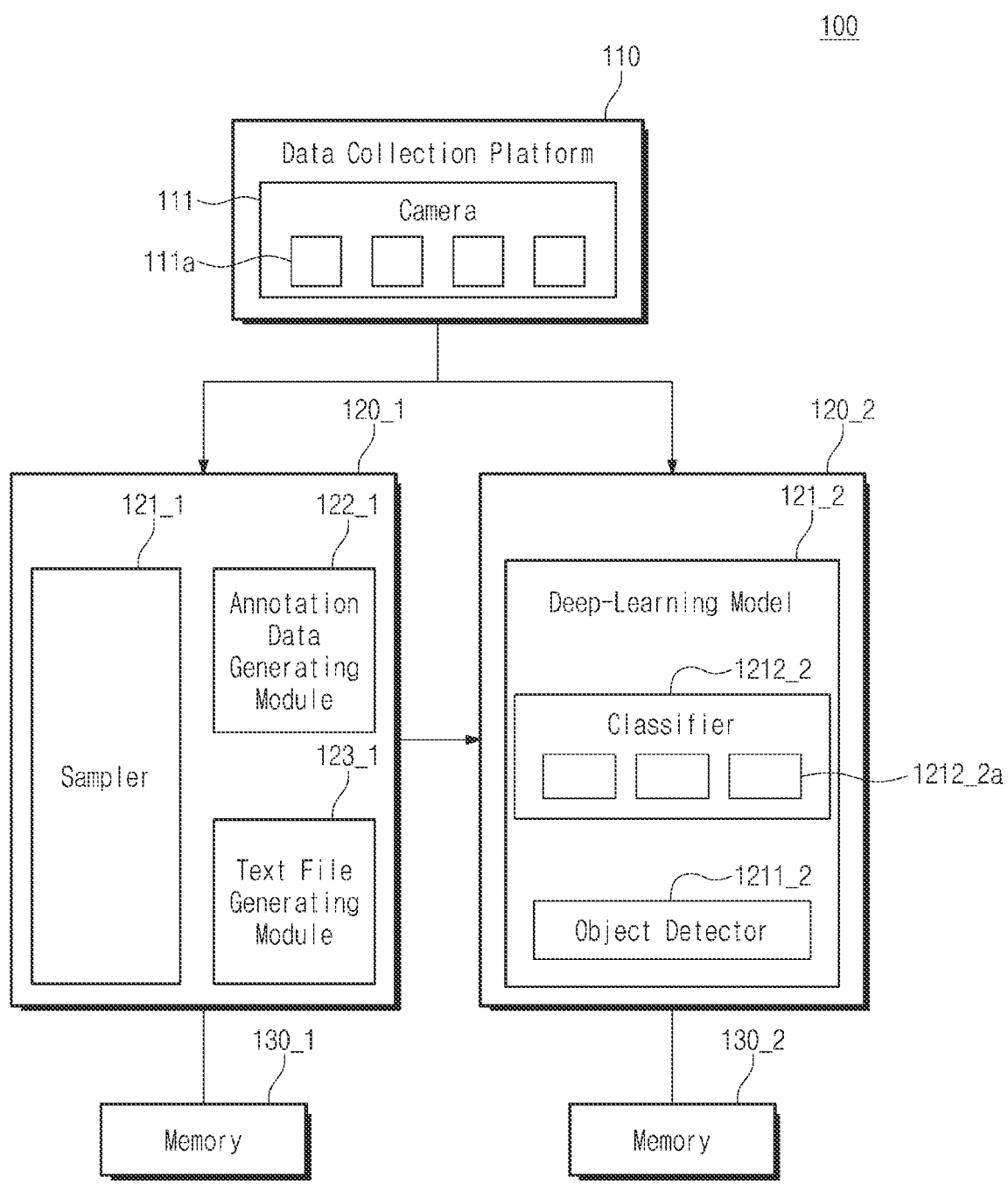
FIG. 1 is a view showing a traffic light recognition model learning and inference system according to an embodiment of the present disclosure.

FIG. 1 is a view showing a traffic light recognition model learning and inference system 100 according to an embodiment of the present disclosure. Referring to FIG. 1, the traffic light recognition model learning and inference system 100 may include a data collection platform 110, a first processor 120_1, a second processor 120_2, a first memory 130_1, and a second memory 130_2.

The data collection platform 110 may collect data from an external device or an external system. The data collection platform may be a mobility means such as a car, a bus, or a bicycle in which a camera 111 is installed. However, the present disclosure is not limited thereto, and the data collection platform may include any mobility means including at least one sensor capable of collecting and storing data.

The first processor 120_1 and the second processor 120_2 may drive an operating system and applications of the traffic light recognition model training system. The first processor 120_1 and the second processor 120_2 may load and execute codes stored in a storage (not shown) into the first memory 130_1 and the second memory 130_2, respectively, to drive the operating system and applications.

The first memory 130_1 and the second memory 130_2 may be operational memories of the traffic light recognition model learning and inference system 100. The first memory 130_1 and the second memory 130_2 may be implemented with various random access memories such as dynamic random access memory, phase change random access memory, ferroelectric random access memory, magnetic random access memory, resistive random access memory, or the like.

The data collection platform 110 may collect at least one image data. However, the present disclosure is not limited thereto, and the data collection platform 110 may collect all data including visual information, such as images, videos, or visual content.

The data collection platform 110 may include the camera 111 to collect at least one image data. The camera 111 may include at least one image sensor 111a to detect data including visual information such as images, videos, and visual content.

The at least one image sensor 111a may be one of a charge coupled device (CCD) image sensor and a complementary metal oxide semiconductor (CMOS) image sensor. However, the at least one image sensor 111a included in the camera 111 is not limited thereto, and may include any image sensor capable of detecting data including visual information such as images, videos, and visual content.

The first processor 120_1 may include a sampler 121_1, an annotation data generating module 122_1, and a text file generating module 123_1. The sampler 121_1 may receive image data from the data collection platform 110 and sample traffic light image data including a traffic light among the image data. The annotation data generating module 122_1 may generate annotation data based on the traffic light image data. The text file generating module 123_1 may generate a traffic light data set by using the traffic light image data and the annotation data.

The traffic light image data may include information on the location of a traffic light, the type of a traffic light, whether a traffic light is turned on, and the traffic signal direction of a traffic light. The traffic light data set may include information on a location of a traffic light, a type of the traffic light, whether the traffic light is turned on, and a traffic signal direction, included in the traffic light image data.

When the second processor 120_2 may receive the traffic light data set, the second processor 120_2 may learn a traffic light location based on the traffic light data set. When the second processor 120_2 receives the traffic light data set, the second processor 120_2 may learn a traffic light status (the type of a traffic light, whether the traffic light is turned on, or the traffic signal direction of the traffic light) based on the traffic light data set. The second processor 120_2 may learn the traffic light status independently of learning the traffic light location.

The second processor 120_2 may include a deep-learning model 121_2 including an object detector 1211_2 and a classifier 1212_2. The deep-learning model 121_2 may allow the object detector 1211_2 to learn the traffic light location and the classifier 1212_2 to learn the traffic light status. The deep-learning model 121_2 may convert input data into output data. The input data may be image data and a traffic light data set.

The output data may be first learning data obtained by learning the traffic light location. Alternatively, the output data may be second learning data obtained by learning the traffic light status. The deep-learning model 121_2 may learn a traffic light location and a traffic light status based on a convolutional neural network.

The object detector 1211_2 may infer a location of a traffic light based on the first learning data. The classifier 1212_2 may infer a traffic light status based on the second learning data.

The first memory 130_1 may be an operation memory of the first processor 120_1. The first memory 130_1 may temporarily store image data. The first memory 130_1 may temporarily store traffic light image data. The first memory 130_1 may temporarily store annotation data. The first memory 130_1 may temporarily store a traffic light data set.

The second memory 130_2 may be an operation memory of the second processor 120_2. The second memory 130_2 may temporarily store the traffic light data set when the second processor 120_2 receives the traffic light data set. The second memory 130_2 may temporarily store data on a learning condition of the deep-learning model 121_2. The second memory 130_2 may temporarily store first learning data obtained by learning the traffic light location. The second memory 130_2 may temporarily store second learning data obtained by learning the traffic light status.

Figure 2:
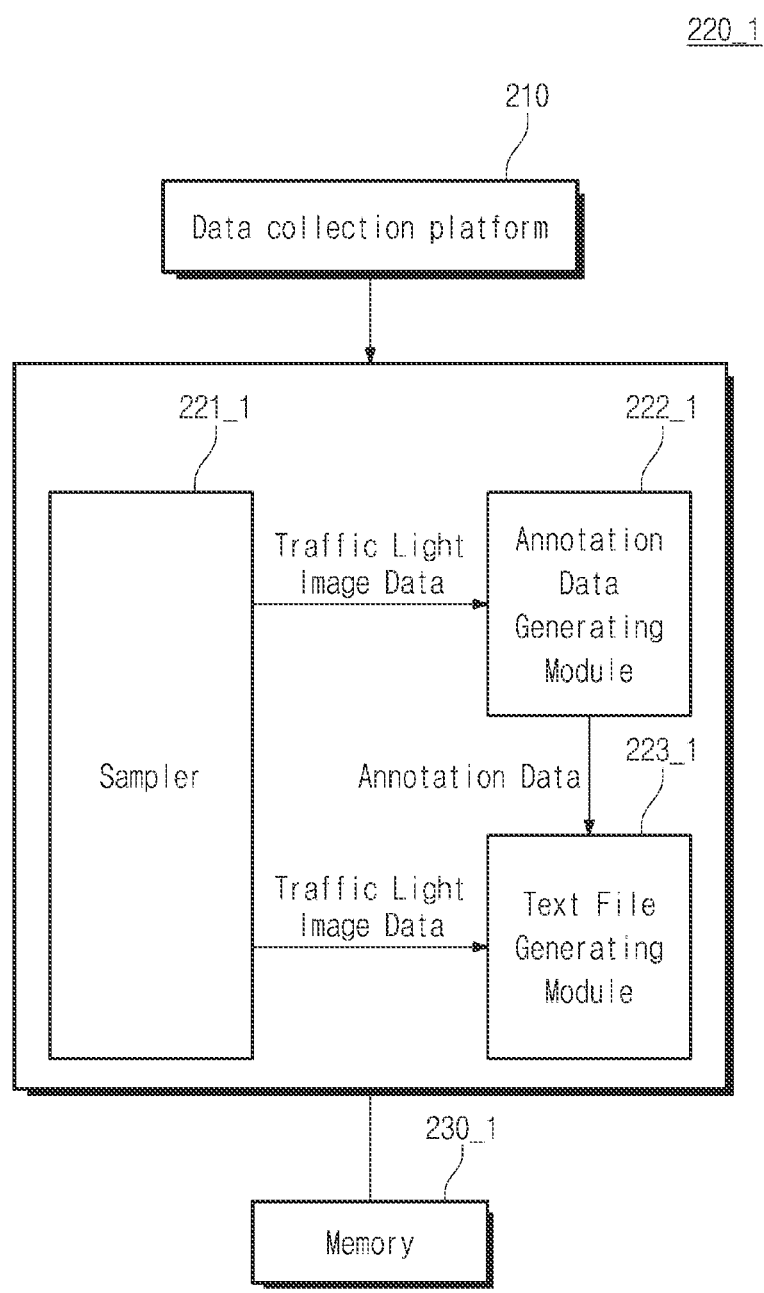
FIG. 2 is a diagram specifically illustrating a first processor.

FIG. 2 is a diagram specifically illustrating a first processor 220_1. For example, a data collection platform 210 and a first memory 230_1 of FIG. 2 may correspond to the data collection platform 110 and the first memory 130_1 of FIG. 1. Accordingly, redundant descriptions of similar components and similar operations related thereto will be omitted.

Referring to FIG. 2, the first processor 220_1 may include a sampler 221_1, an annotation data generating module 222_1, and a text file generating module 223_1. When the first processor 220_1 receives image data from the data collection platform 110, the sampler 221_1 may sample image data including a traffic light among the image data. (Hereinafter, the sampled image data is referred to as traffic light image data.)

The annotation data generating module 222_1 may receive the traffic light image data from the sampler 221_1 and generate annotation data. The annotation data generating module 222_1 may generate the annotation data in the form of a one-dimensional vector having a size of 24. A detailed description of the annotation data will be given later with reference to FIGS. 3 and 4.

The text file generating module 223_1 may receive the traffic light image data from the sampler 221_1, receive the annotation data from the annotation data generating module 222_1, and generate a traffic light data set based on the traffic light image data and the annotation data.

The traffic light data set may include information on the location of a traffic light, the type of a traffic light, whether a traffic light is turned on, and the traffic signal direction of a traffic light. The traffic light data set may include a plurality of data sets including one annotation information per traffic light image data. The annotation information may be text converted from annotation data based on traffic light image data. The traffic light data set may include one annotation data for each traffic light image data. A detailed description of the annotation information will be given later with reference to FIG. 5.

Figure 3:
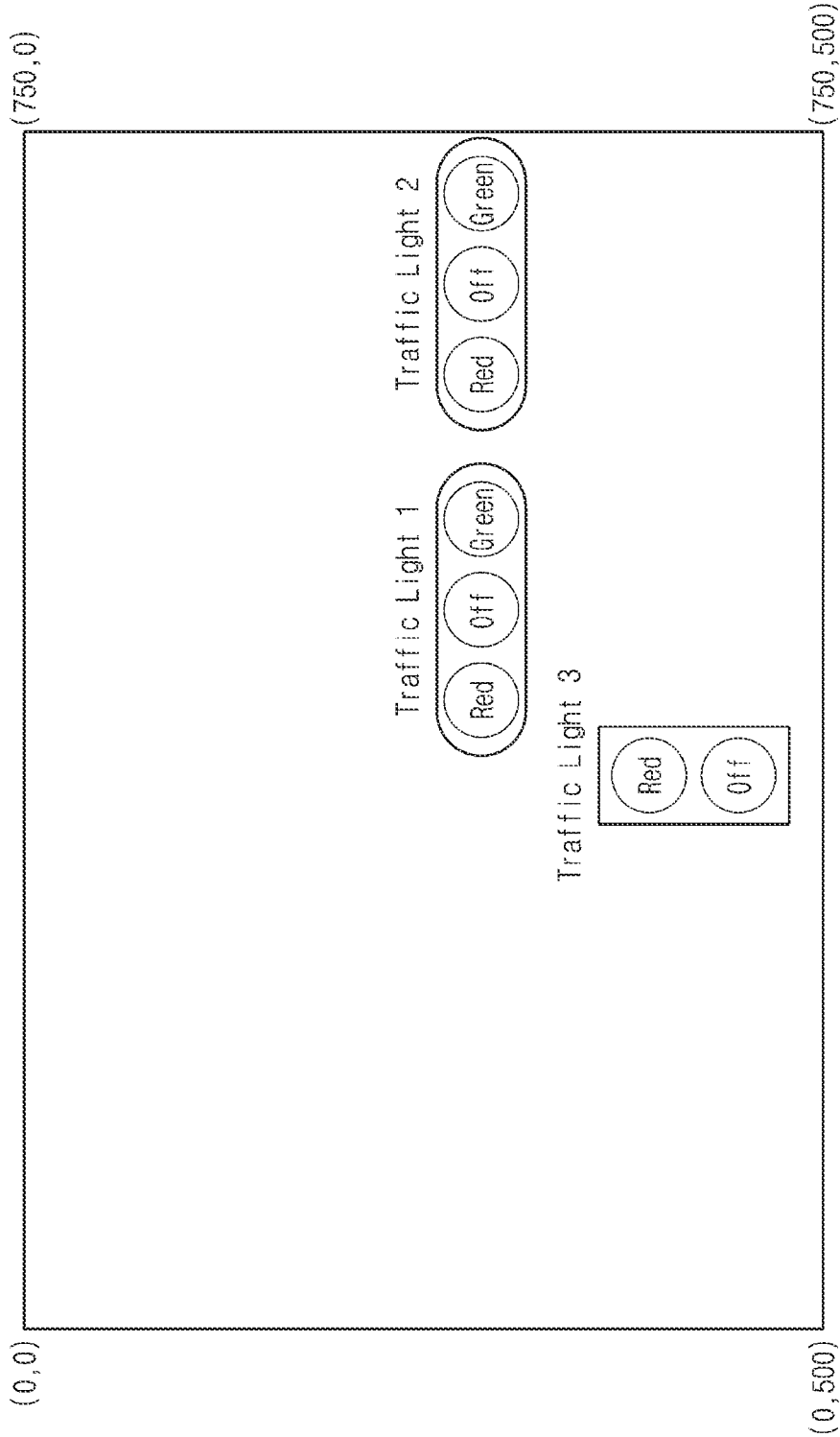
FIG. 3 is a diagram illustrating annotation data and image data collected by a data collection platform.

FIG. 3 is a diagram illustrating the annotation data and image data collected by a data collection platform 110 and 210 of FIGS. 1 and 2. For example, image data is shown in FIG. 3 in the form of a 2D bounding box.

The annotation data may be expressed in the form of a one-dimensional vector having a size of 24 based on traffic light image data. The annotation data expressed as a one-dimensional vector having a size of 24 may be a sum of vectors having a size for each piece of information included in the annotation data.

For example, the annotation data may be expressed as the sum of a vector having a size of 4 for a traffic light location, a vector having a size of 4 for a traffic light type, a vector having a size of 7 for whether the traffic light is turned on, and a vector having a size of 9 for the traffic signal direction of a traffic light.

The value of a two-dimensional bounding box for the traffic light location may correspond to a vector size of 1 per one coordinate value. The traffic light locations may be expressed as coordinate values (X-minimum value (xmin), Y-minimum value (ymin), X-maximum value (xmax), Y-maximum value (ymax)) within the two-dimensional bounding box surrounded by the upper left vertex (0,0,0,0), the lower left vertex (0,m,0,m), the upper right vertex (n,0,n,0), and the lower right vertex (n,m,n,m). The traffic light location may be expressed as a vector size of 4.

The X-minimum value may refer to an X-coordinate value of an object whose distance between the Y-axis and the object is the minimum when viewed in the direction of the X-axis on the right side with respect to the Y-axis on the left side. The X-maximum value may refer to an X-coordinate value of an object whose distance between the Y-axis and the object is the maximum when viewed in the direction of the X-axis on the right side with respect to the Y-axis on the left side. The difference between the X-minimum value and the X-maximum value may refer to the horizontal width of the object.

The Y-minimum value may refer to a Y-coordinate value of an object whose distance between the X-axis and the object is the minimum when viewed in the direction of the Y-axis on the bottom with respect to the Y-axis on the top.

The Y-maximum value may refer to a Y-coordinate value of an object whose distance between the X-axis and the object is the maximum when viewed in the direction of the Y-axis on the bottom with respect to the Y-axis on the top. The difference between the Y-minimum value and the Y-maximum value may refer to the vertical width of the object.

The annotation data generating module 222_1 may recognize a traffic light type based on the traffic light image data, and generate a traffic light type vector as a vector having a size of 4, which has a value of 0 or 1 depending on whether each type of traffic light is The annotation data generating module 222_1 may recognize whether a traffic light is turned on based on the traffic light image data, and generate a traffic light on/off vector as a vector having a size of 7, which has a value of 0 or 1 according to whether each traffic light is turned on.

Turning on an arrow light may mean turning on a traffic light including a traffic signal direction. Turning on a non-arrow light may mean turning on a traffic light without a traffic signal direction. Traffic light on/off may mean that a traffic light is turned on or is lighted when the traffic light on/off has a value of 1. Traffic light on/off may mean that a traffic light is turned off or is not lighted when the traffic light on/off has a value of 0.

The annotation data generating module 222_1 may recognize a traffic signal direction of a traffic light based on the traffic light image data, and generate a traffic signal direction vector as a vector having a size of 9 which has a value of 0 or 1 according to whether a traffic signal direction light of each traffic light is turned on.

Similarly, arrow light on/off may mean that an arrow light is turned on or is lighted when the arrow light on/off has a value of 1. Arrow light on/off may mean that an arrow light is turned off or is not lighted when the arrow light on/off has a value of 0.

Annotation data may be expressed as a one-hot vector when only one data is selected at the same time, such as traffic light type, "arrow light on/off", or "all traffic lights off" and may be expressed as a multi-hot vector when two or more pieces of data are selected at the same time, such as non-arrow light on/off or an arrow direction.

The one-hot vector may refer to vectors determined by a traffic light type, arrow light on/off, or all traffic light on/off regardless of other traffic light statuses such as traffic light types, arrow light on/off, or all traffic light off. The multi-hot vectors may refer to vectors whose form is changed depending on vectors of arrow light on/off such as vectors expressing non-arrow light on/off and an arrow direction.

Referring to FIG. 3, the location of traffic light 1 may be expressed as coordinate value 1 (556, 309, 605, 330) as a one-dimensional vector having a size of 4. The annotation data generating module 222_1 may interpret the location of traffic light 1 having a width of 49 and a height of 21 through a one-dimensional vector of size 4 having coordinate value 1 (556, 309, 605, 330).

The type of traffic light 1, whether or not the traffic light 1 is turned on, and the traffic signal direction of traffic light 1 (hereinafter, referred to as a traffic light status) may be expressed as "10001000010001000000" as a one-dimensional vector having a size of 20. The annotation data generating module 222_1 may interpret that traffic light 1 is a vehicle traffic light, a green arrow light and a non-arrow red light are turned on, and a traffic signal direction (arrow direction) is west through the one-dimensional vector "10001000010001000000" having a size of 20.

The location of traffic light 2 may be expressed as coordinate value 2 (686, 310, 734, 329) as a one-dimensional vector having a size of 4. The annotation data generating module 222_1 may interpret the location of traffic light 2 having a width of 48 and a height of 19 through a one-dimensional vector of size 4 having coordinate value 2 (686, 310, 734, 329).

The type of traffic light 2, whether or not the traffic light 2 is turned on, and the traffic signal direction of traffic light 2 (hereinafter, referred to as a traffic light status) may be expressed as "10001000010001000000" as a one-dimensional vector having a size of 20. The annotation data generating module 222_1 may interpret that traffic light 2 is a vehicle traffic light, a green arrow light and a non-arrow red light are turned on, and a traffic signal direction (arrow direction) is west through the one-dimensional vector "10001000010001000000" having a size of 20.

The location of traffic light 3 may be expressed as coordinate value 2 (393, 425, 412, 475) as a one-dimensional vector having a size of 4. The annotation data generating module 222_1 may interpret the location of traffic light 3 having a width of 19 and a height of 50 through a one-dimensional vector of size 4 having coordinate value 3 (393, 425, 412, 475).

The type of traffic light 3, whether or not the traffic light 3 is turned on, and the traffic signal direction of traffic light 2 (hereinafter, referred to as a traffic light status) may be expressed as "01000000010000000000" as a one-dimensional vector having a size of 20. The annotation data generating module 222_1 may interpret that traffic light 3 is a pedestrian traffic light, and a non-arrow red light is turned on, through the one-dimensional vector "01000000010000000000" having a size of 20.

Figure 4:
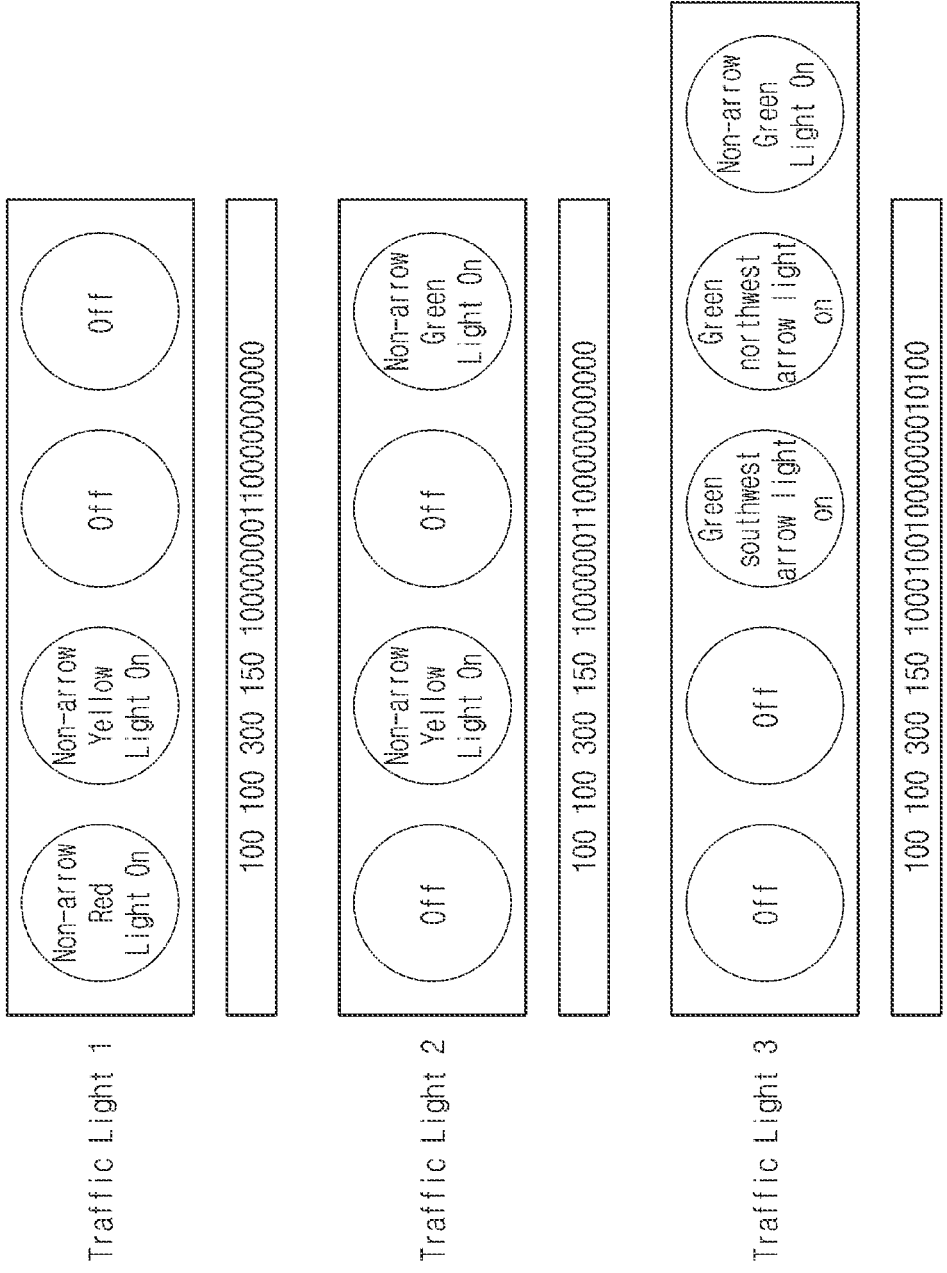
FIG. 4 is a diagram illustrating a traffic light state and annotation data having a plurality of classification information.

FIG. 4 is a diagram illustrating a traffic light status and annotation data having a plurality of classification information. For example, in FIG. 4, it is assumed that the locations of traffic lights 1 to 3 are the same as each other to identify annotation data for statuses of a traffic light having a plurality of classification information.

Referring to FIG. 4, the traffic light status of the traffic light 1 may be expressed as "10000000110000000000" as a one-dimensional vector having a size of 20. The annotation data generating module 222_1 may interpret that traffic light 1 is a vehicle traffic light, and a non-arrow yellow light and a non-arrow red light are turned on, through the one-dimensional vector "10000000110000000000" having a size of 20.

The traffic light status of the traffic light 2 may be expressed as "10000001100000000000" as a one-dimensional vector having a size of 20. The annotation data generating module 222_1 may interpret that traffic light 2 is a vehicle traffic light, and a non-arrow green light and a non-arrow yellow light are turned on, through the one-dimensional vector "10000001100000000000" having a size of 20.

The traffic light status of the traffic light 3 may be expressed as "10001001000000010100" as a one-dimensional vector having a size of 20. The annotation data generating module 222_1 may interpret that traffic light 3 is a vehicle traffic light, a green arrow light and a non-arrow green light are turned on, and a traffic signal direction (arrow direction) is northwest and southwest through the one-dimensional vector "10001001000000010100" having a size of 20.

Each of the one-dimensional vectors for the traffic lights described in FIGS. 3 and 4 is only an example of the annotation data generated by the annotation data generating module 222_1 based on the traffic light image data. The annotation data generating module 222_1 may further generate annotation data not represented in FIGS. 3 and 4 based on traffic light image data not shown in FIGS. 3 and 4.

Figure 5:
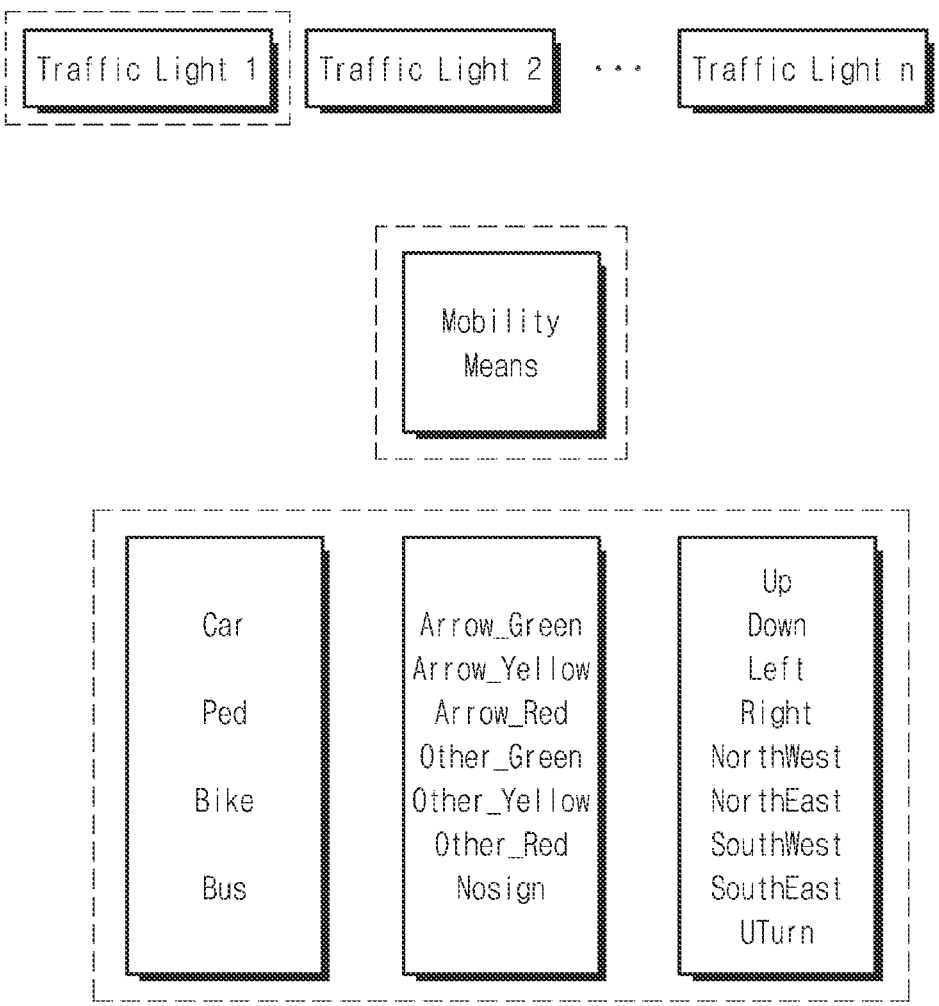
FIG. 5 is a diagram showing a traffic light data set.

FIG. 5 is a diagram showing a traffic light data set. In FIG. 5, the traffic light data set may include traffic light image data and annotation information. For example, in the annotation information, "Car" may mean a vehicle traffic light, "Ped" may mean a pedestrian traffic light, "Bike" may mean a bicycle traffic light, and "Bus" may mean a bus traffic light. However, the type of the traffic light is not limited thereto and may include any object having the shape of a traffic light.

The mobility means may be at least one of a vehicle, a bicycle, and a bus. However, the present disclosure is not limited thereto, and may include any mobility means capable of moving with power generated by itself.

In the annotation information, "Arrow_Green" means turning-on of a green arrow light, "Arrow_Yellow" means turning-on of a yellow arrow light, "Arrow_Red" means turning-on of a red arrow light, "Other-green" indicates turning-on of a non-arrow green light, "Other_Yellow" means turning-on of a non-arrow yellow light, "Other_Red" means turning-on of a non-arrow red light, and "Nosign" means that all lights are turned off.

In the annotation information, "Up" means that the arrow direction is north, "Down" indicates that the arrow direction is south, "Left" indicates that the arrow direction is west, "Right" means that the arrow direction is east, "NorthWest" means that the arrow direction is northwest, "NorthEast" means that the arrow direction is northeast, "SouthWest" means that the arrow direction is southwest, "SouthEast" means that the arrow direction is southeast, and "UTurn" means that the arrow direction is U-turn.

Referring to FIGS. 2 and 5, the text file generating module 223_1 may recognize a traffic light location and a traffic light status from traffic light image data. The text file generating module 223_1 may recognize a traffic light location and perform labeling on at least one traffic light. The text file generating module 223_1 may generate a traffic light data set based on the annotation information on the recognized traffic light location and the recognized traffic light status. The traffic light data set may be in the form of a text file.

The annotation information included in the traffic light data set may be what is obtained by expressing, as text, information on the traffic light location and the traffic light status included in the annotation data based on the traffic light image data. The text file generating module 223_1 may include application software (not shown) to express the annotation data as text.

Figure 6:
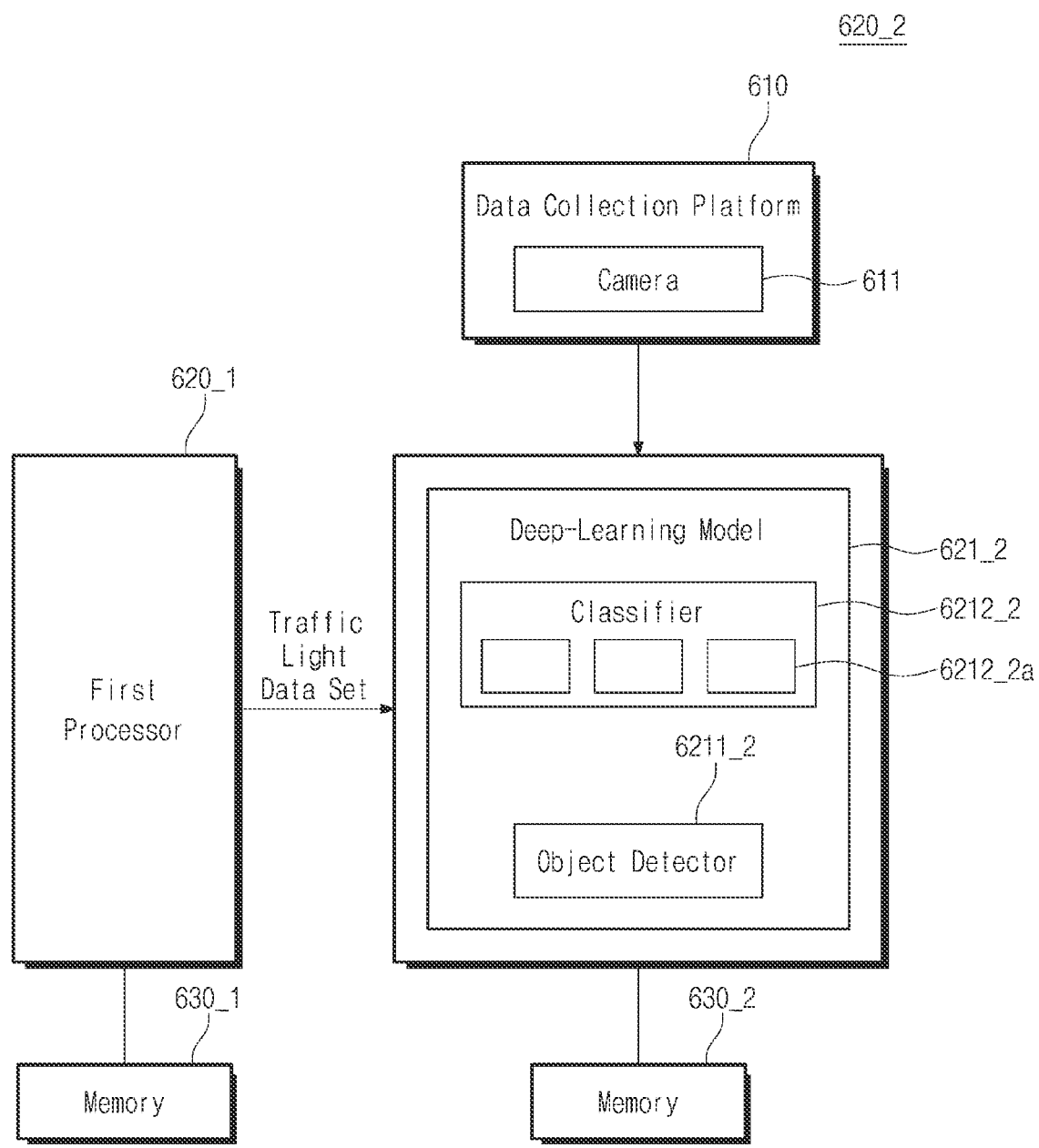
FIG. 6 is a diagram specifically illustrating a second processor.

FIG. 6 is a diagram illustrating a second processor 620_2. For example, a data collection platform 610, a first processor 620_1, a first memory 630_1, and a second memory 630_2 in FIG. 6 may correspond to the data collection platform 110, the first processor 120_1, the first memory 130_1, and the second memory 130_2 in FIG. 1, respectively. Accordingly, redundant descriptions of similar components and similar operations related thereto will be omitted.

Referring to FIG. 6, the second processor 120_2 may include a deep-learning model 621_2 including an object detector 6211_2 and a classifier 6212_2. The second processor 620_2 may receive image data from the first processor 620_1 or the data collection platform 610. The second processor 620_2 may receive a traffic light data set from the first processor 620_1.

The second processor 620_2 may learn a traffic light location and a traffic light status based on the traffic light data set and image data. The second processor 620_2 may infer a traffic light location and a traffic light status based on the image data.

The object detector 6211_2 may recognize a traffic light location when the second processor 620_2 receives the traffic light data set. The object detector 6211_2 recognizing the traffic light location may mean determining whether there is at least one traffic light labeled in the traffic light data set. After the object detector 6211_2 determines the labeled traffic light and recognizes a traffic light location, the traffic light location may be inferred.

The classifier 6212_2 may recognize a traffic light status when the second processor 620_2 receives the traffic light data set. The classifier 6212_2 recognizing the traffic light status may mean determining annotation information included in the traffic light data set. After the classifier 6212_2 recognizes the traffic light status by determining the annotation information, the traffic light status may be inferred.

The deep-learning model 621_2 may be trained to allow the object detector 6211_2 to infer the traffic light location based on the convolutional neural network. A convolutional neural network may be configured to process an input image to generate an output image. For reference, the convolutional neural network may be based on R-CNN, Fast R-CNN, Faster R-CNN, Mask R-CNN, or various types of convolutional neural networks similar thereto, but is not limited to the aforementioned network.

The input image may be an image including a labeled traffic light. The output image may include a labeled traffic light by newly labeling a traffic light included in the input image by the deep-learning model 621_2. The deep-learning model 621_2 may be trained to allow the object detector 6211_2 to infer the traffic light location by comparing the positions of traffic lights in the input image and the output image.

Meanwhile, the labeling of the traffic light included in the output image output by the deep-learning model 621_2 may not match the labeling of the traffic light included in the input image. The deep-learning model 621_2 may learn the object detector 6211_2 by comparing the labeling of the output image and the labeling of the input image.

The deep-learning model 621_2 may be trained to allow the classifier 6212_2 to classify the traffic light status based on the convolutional neural network. The classifier 6212_2 may include twenty binary classifiers 6212_2a for traffic light statuses (a traffic light type vector of size 4, a traffic light on/off vector of size 7, and a traffic signal direction vector of size 9).

The deep-learning model 621_2 may allow the classifier 6212_2 to classify a traffic light status to generate two or more traffic light status vectors. Each of the traffic light status vectors may mean a vector including a magnitude vector for each of a traffic light type, traffic light on/off, and a traffic signal direction.

The deep-learning model 621_2 may learn the classifier 6212_2 to allow the twenty binary classifiers 6212_2a to combine binary values for the traffic light type, the traffic light on/off, and the traffic signal direction and classify the combined binary value into a plurality of traffic light statuses. Each of the two or more traffic light status vectors may include bits indicating the traffic light type, the traffic light on/off, and the traffic signal direction.

The deep-learning model 621_2 may learn the object detector 6211_2 and the classifier 6212_2 according to learning conditions of the convolutional neural network. The learning conditions may include information of an input image size, data augmentation, a learning rate, momentum, weight decay, schedule, epoch, a batch size, and an evaluation cycle.

The data augmentation may mean converting an input image of image data into a plurality of pieces of data to increase the amount of data. For example, the data augmentation may be one of color jitter, data shearing, or data translation techniques. However, the present disclosure is not limited thereto and may include all data augmentation techniques capable of converting the input image of image data into a plurality of pieces of data.

The epoch may mean the number of uses of entire data for one training. For example, when the epoch is 300, the epoch may mean that the traffic light data set is used 300 times for one training of the deep-learning model 121_2.

The batch size may mean a data size in which entire data is divided and input due to the limitation and speed of the second memory 130_2 when the entire data is used once, that is, when the epoch is 1. For example, the fact that the batch size is 64 may mean that one traffic light data set is divided into 64 pieces of data and input to the deep-learning model 121_2.

The learning condition may be changed according to the image data collection environment, the size of the traffic light data set, and the performance of the camera 611. A detailed description of the configuration in which the deep-learning model 621_2 learns the object detector 6211_2 and the classifier 6212_2 will be described later.

Figure 7:
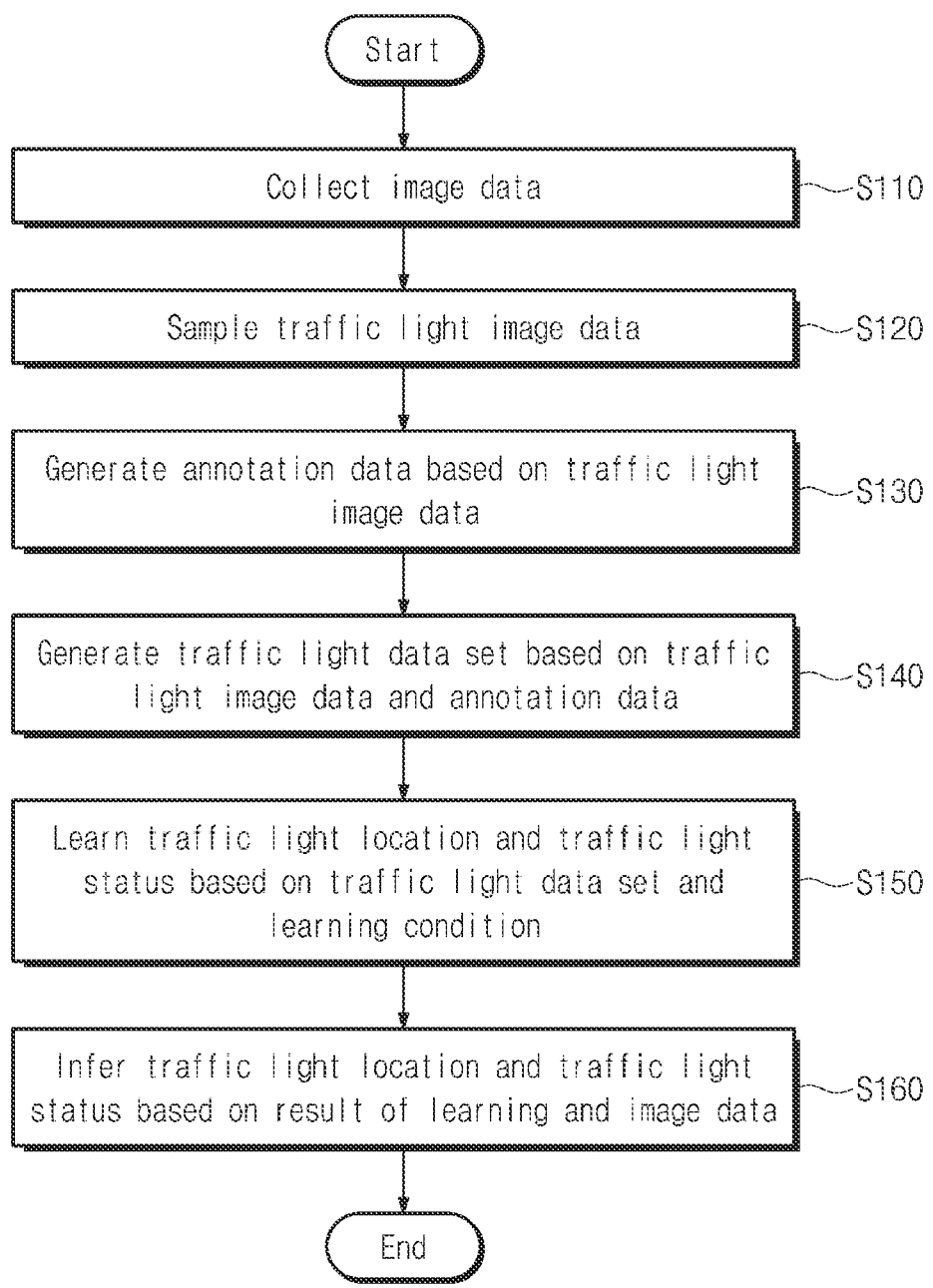
FIG. 7 is a flowchart of a traffic light recognition model learning and inference method according to an embodiment of the present disclosure.

FIG. 7 is a flowchart of a traffic light recognition model learning and inference method according to an embodiment of the present disclosure.

Referring to FIGS. 1 and 7, the traffic light recognition model learning and inference method may include collecting image data from the data collection platform 110 (S110), sampling, by the first processor 120_1, traffic light image data including a traffic light among the image data (S120), generating, by the first processor 120_1, annotation data based on the traffic light image data (S130); generating, by the first processor 120_1, a traffic light data set by using the traffic light image data and the annotation data (S140), receiving by the second processor 120_2, the traffic light data set and learning a traffic light location and a traffic light status based on the traffic light data set and a learning condition (S150), and predicting, by the second processor 120_2, the traffic light location and classifying the traffic light status based on a result of the learning and the image data (S160).

The learning conditions may include information of an input image size of the image data, data augmentation, a learning rate, momentum, weight decay, schedule, epoch, a batch size, and an evaluation cycle. The learning condition may be changed according to collection environment of the image data, the size of the traffic light data set, and the performance of the camera 111.

Data augmentation may mean converting an image data input image into a plurality of pieces of data to increase the amount of data. For example, the data augmentation may be one of color jitter, data shearing, or data translation techniques. However, the present disclosure is not limited thereto and may include all data augmentation techniques capable of converting the input image of image data into a plurality of pieces of data.

The epoch may mean the total number of uses of data for one training. The batch size may mean a data size in which entire data is divided and input due to the limitation and speed of the second memory 130_2 when the entire data is used once, that is, when the epoch is 1.

In step S110, the camera 111 included in the data collection platform 110 may collect at least one image data. The camera 111 may include the at least one image sensor 111*a*, and the at least one image sensor 111*a* may be one of a charge coupled device (CCD) image sensor and a complementary metal oxide semiconductor (CMOS) image sensor. The data collection platform 110 may collect at least one image data through the at least one image sensor 111*a*.

In step S120, the sampler 121_1 included in the first processor 120_1 may sample traffic light image data including a traffic light among the image data. The sampler 121_1 may include at least one sensor disposed in a two-dimensional form to sample the traffic light image data.

In step S130, the annotation data generating module 122_1 included in the first processor 120_1 may generate annotation data based on the traffic light image data. The annotation data is expressed as a one-dimensional vector having a size of 24, and may include information about a traffic light location, a traffic light type, whether a traffic light is turned on, and a traffic signal direction.

In step S140, the text file generating module 123_1 included in the first processor 120_1 may generate a traffic light data set based on the traffic light image data and the annotation data. The text file generating module 123_1 may include application software (not shown) that converts the annotation data into text such that the traffic light data set includes one piece of annotation information for each traffic light image data.

In step S150, the deep-learning model 121_2 included in the second processor 120_2 may be trained to allow the object detector 1211_2 included in the deep-learning model 121_2 to predict a traffic light location and allow the classifier 1212_2 included in the deep-learning model 121_2 to classify a traffic light status. When the second processor 120_2 receives the traffic light data set, the deep-learning model 121_2 may learn the object detector 1211_2 and the classifier 1212_2 based on a learning condition.

The deep-learning model 121_2 may predict a traffic light location and classify a traffic light status based on a convolutional neural network. A detailed description of the configuration in which the deep-learning model 121_2 learns the object detector 1211_2 and the classifier 1212_2 will be described later.

In step S160, the object detector 1211_2 included in the second processor 120_2 may infer the traffic light location based on a result of the learning and the image data, and the classifier 1212_2 included in the second processor 120_2 may infer the traffic light status based on the result of the learning and the image data. A detailed description of configuration of applying the deep-learning model 121_2 to the object detector 1211_2 and the classifier 1212_2 will be described later.

Figure 8:
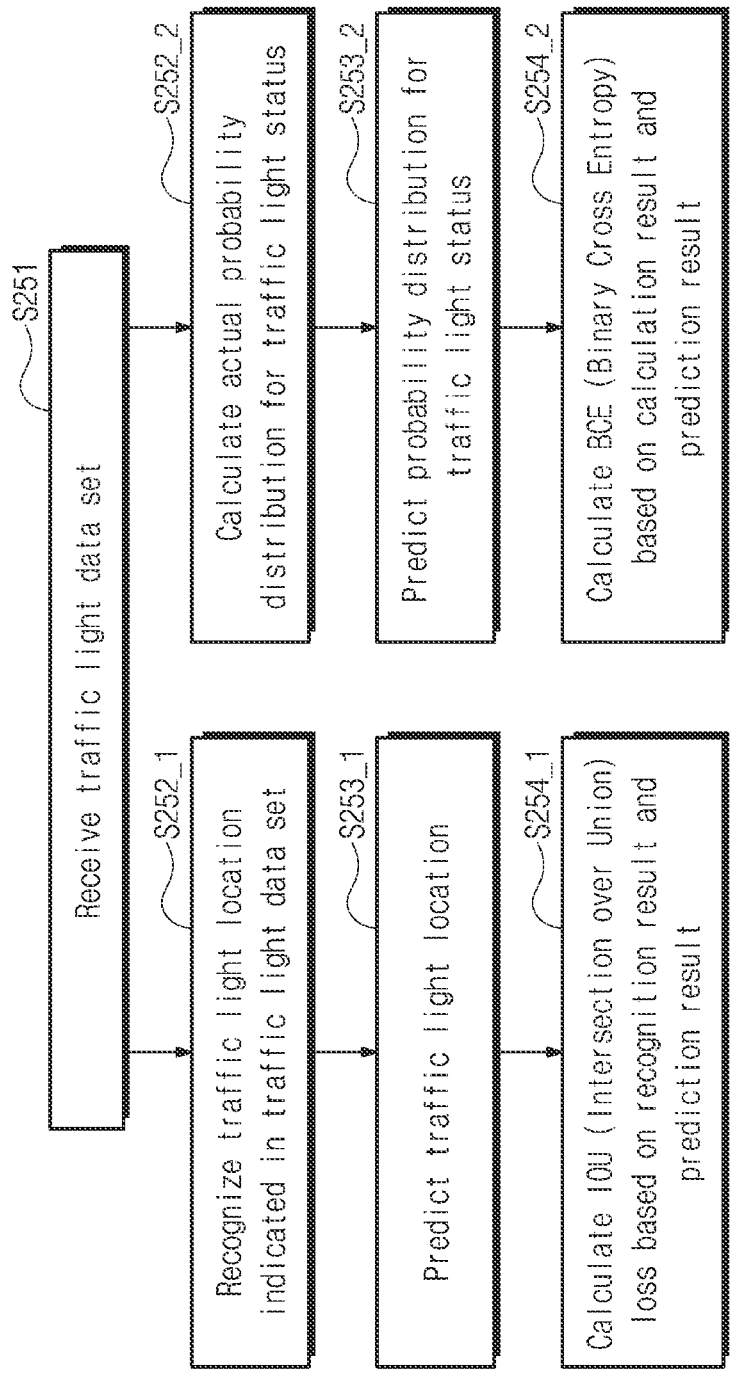
FIG. 8 is a detailed flowchart of a process in which the second processor of FIG. 1 learns a traffic light location and a traffic light status.

FIG. 8 is a detailed flowchart of a step in which the second processor 120_2 of FIG. 1 learns a traffic light location and a traffic light status. For example, the step of learning the traffic light location (steps S251 to S254_1) may be performed independently of the step of learning the traffic light status (steps S251 to S254_2). Accordingly, FIG. 8 shows the step of learning the traffic light location (steps S251 to S254_1) and the step of learning the traffic light status (steps S251 to S254_2) in parallel.

Referring to FIGS. 1 and 8, the step of learning the traffic light location may include receiving, by the second processor 120_2, a traffic light data set (S251), recognizing, by the object detector 1211_2, a traffic light location indicated in the traffic light data set (S252_1), predicting, by the deep-learning model 121_2, the traffic light location (S253_1), and calculating, by the deep-learning model 121_2, a loss based on a result of the recognition and a result of the recognition (S254_1). The traffic light location indicated in the traffic light data set may mean a traffic light location labeled in the traffic light data set.

The deep-learning model 121_2 may perform a regression task to learn a traffic light location. The regression task may refer to an operation in which the deep-learning model 621_2 matches the traffic light location labeled in the traffic light data set and a newly-labeled traffic light location. Hereinafter, steps S253_1 and S254_1 for the regression task will be described in detail.

In step S253_1, the deep-learning model 121_2 may be based on a convolutional neural network. The convolutional neural network may consist of a plurality of layers. Each of the plurality of layers may include at least one parameter. Each of the weights (initial set of weights) of the plurality of layers may be initially set to a random value.

The deep-learning model 121_2 may predict a traffic light location by multiplying the plurality of layers by an initial set of weights, and output an output image with labeled the traffic light location based on a result of the prediction. The deep-learning model 121_2 may perform the step of predicting the traffic light location to minimize the loss in step S254_1, which will be described later, and outputting an output image, several times.

In step S254_1, the deep-learning model 121_2 based on the convolutional neural network may calculate the loss based on the result of the recognition of step S252_1 and the result of the prediction of S253_1.

The loss may be calculated as the Intersection Over Union (IOU) of the labels of the input image and the output image. Minimizing of the loss may mean increasing an IOU value.

The deep-learning model 121_2 may adjust parameter values of each layer of the convolutional neural network to increase the IOU value. The deep-learning model 121_2 may change the initial set of weights in step S253_1 through the adjusted parameter values.

The learning of the traffic light status may include receiving, by the second processor 120_2, the traffic light data set (S251), calculating, by the classifier 1212_2, an actual probability distribution for the traffic light status (S252_2), predicting, by the deep-learning model 121_2, the probability distribution for the traffic light status (S253_2), and calculating, by the deep-learning model 121_2, a loss based on a result of the calculation and a result of the prediction (S254_2).

The deep-learning model 121_2 may perform a multi-label classification task to learn a traffic light status. The multi-label classification task may refer to a tack of generating a plurality of traffic light statuses in which values of 0 or 1 are combined through the classifier 1212_2a including the twenty binary classifiers 1212_2a. The traffic light status may be a one-dimensional vector of a size of 20.

The deep-learning model 621_2 may allow the classifier 6212_2 to classify a traffic light status to generate two or more traffic light status vectors. Each of the traffic light status vectors may mean a vector including a magnitude vector for each of a traffic light type, traffic light on/off, and a traffic signal direction. Each of the two or more traffic light status vectors may include bits indicating the traffic light type, the traffic light on/off, and the traffic signal direction.

In step S252_2, the classifier 1212_2 may calculate the actual probability distribution in which each of the plurality of traffic light statuses generated through the multi-label classification task is generated. Each of the twenty binary classifiers 1212_2a may have a value of 0 or 1 with respect to the traffic light type, the traffic light on/off, and the traffic signal direction. The twenty binary classifiers 1212_2a may generate a traffic light status having a size of 20 and the form of a one-dimensional vector. The classifier 1212_2 may be initially set such that the sum of the probabilities of the plurality of traffic light statuses that may be generated through the multi-label classification task is one.

In step S253_2, the deep-learning model 121_2 may predict a probability distribution for the plurality of traffic light statuses based on a convolutional neural network. The deep-learning model 121_2 may predict a probability distribution for a plurality of traffic light statuses through at least one parameter of each of a plurality of layers of the convolutional neural network. The deep-learning model 121_2 may perform prediction and inference such that the sum of probabilities of the plurality of traffic light statuses is 1.

In step S254_2, the deep-learning model 121_2 may calculate a loss by calculating a difference between the probability distribution predicted by the deep-learning model 121_2 and the actual probability distribution.

The loss may mean a result of calculation of binary cross entropy. The binary cross entropy may mean a difference between the value of the probability distribution data predicted by the deep-learning model 121_2 and the value of the actual probability distribution data calculated by the classifier 1212_2. Minimizing the loss may mean minimizing the binary cross entropy.

The deep-learning model 121_2 may adjust at least one parameter of each of the plurality of layers of the convolutional neural network to minimize the difference between the probability distribution predicted by the deep-learning model 621_2 and the actual probability distribution calculated by the classifier 1212_2.

Figure 9:
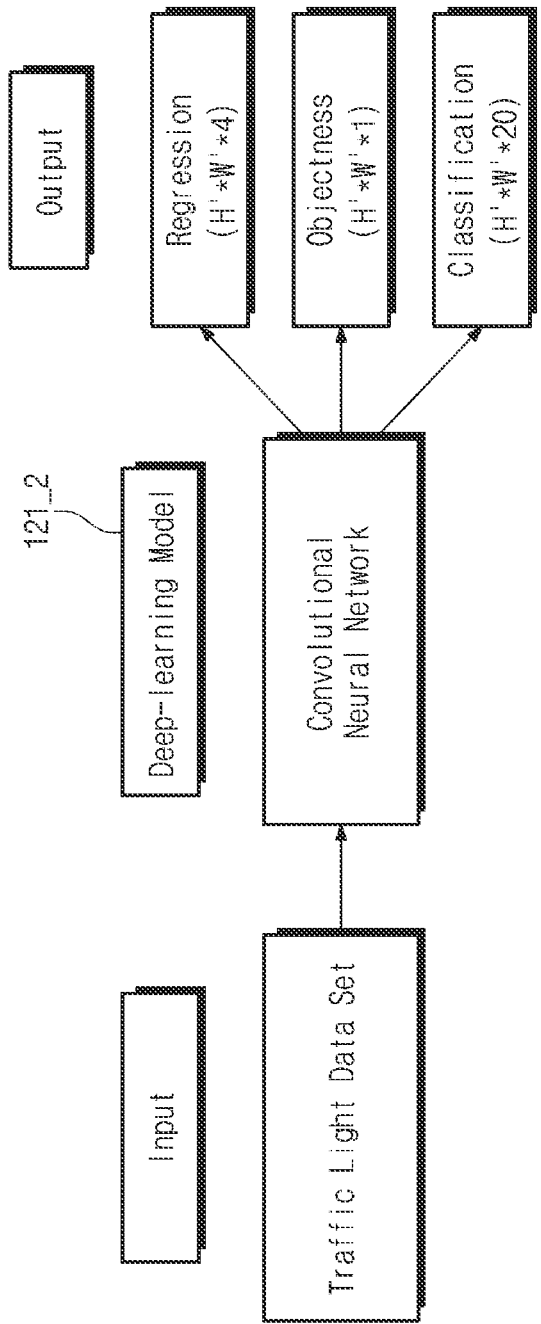
FIG. 9 is an output feature map generated by the deep-learning model of FIG. 1.

FIG. 9 is an output feature map generated by the deep-learning model 121_2 of FIG. 1. Referring to FIGS. 1 and 9, the deep-learning model 121_2 may generate an output feature map by learning the object detector 1211_2 and the classifier 1212_2. In the output feature map, the predicted number of traffic lights may be H'*W'. Each traffic light may be expressed as a one-dimensional vector of a size of 25.

Regression 4 may mean a traffic light location, and Objectness 1 and Classification 20 may mean a probability value related to classification of a traffic light. Objectness 1 may mean a probability value that a labeled object is a traffic light, and classification 20 may mean a probability value that a labeled object is a traffic light of a specific class.

Class Confidence Score may be derived by multiplying Objectness 1 and Classification 20. The class confidence value may mean a probability value that the labeled object is a traffic light of a specific class when there is a traffic light among the labeled objects. The class confidence value may have a value of 0 when there is no traffic light among the labeled objects.

The classifier 1212_2 may compare class confidence values of traffic light types and express the largest value as 1 and the remaining values as 0. The classifier 1212_2 may compare class confidence values of arrow light on/off and express the largest value as 1 and the remaining values as 0. The classifier 1212_2 may perform expression as 1 when the class confidence value of non-arrow light on/off is equal to or greater than a class confidence threshold, and as 0 otherwise. The threshold may vary depending on the neural network type, depth, or the like of the trained traffic light recognition model.

Turning on an arrow light may mean turning on a traffic light with a traffic signal direction. Turning on a non-arrow light may mean turning on a traffic light without a traffic signal direction.

The classifier 1212_2 may perform expression as 1 when the class confidence value of a traffic signal direction is equal to or greater than a class confidence threshold, and as 0 otherwise. The threshold may vary depending on the neural network type, depth, or the like of the trained traffic light recognition model.

The classifier 1212_2 may express a vector value of all traffic light off as 1 and a vector value of arrow equalization and non-arrow light on as 0 when the class confidence values of all traffic light off are greater than values of the arrow light on and non-arrow light on.

The traffic light recognition model learning and inference method and system according to an embodiment of the present disclosure construct a traffic light data set during autonomous driving and express a plurality of traffic light statuses (locations of traffic lights, types of traffic lights, traffic light on/off, traffic signal direction of traffic lights). According to an embodiment of the present disclosure, it is possible to effectively train a deep-learning model using the traffic light data set, and infer the location of the traffic light, the type of the traffic light, traffic light on/off, and the traffic signal direction of the traffic light based on the trained deep-learning model.

The above are specific embodiments for carrying out the present disclosure. The present disclosure will include not only the above-described embodiments, but also simple design changes or easily changeable embodiments. In addition, the present disclosure will include techniques that can be easily modified and implemented using the embodiments. Therefore, the scope of the present disclosure should not be limited to the above-described embodiments, but should be defined by the claims described below as well as the claims and equivalents of the present disclosure.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A system for executing a traffic light recognition model learning and inference method, comprising:
    a data collection platform including a camera for collecting image data; and
    a first processor configured to sample traffic light image data including a traffic light among the image data, generate annotation data based on the traffic light image data, and generate a traffic light data set using the traffic light image data and the annotation data,
    wherein the traffic light data set includes information on a location of the traffic light, a type of the traffic light, traffic light on/off, and a traffic signal direction of the traffic light,
    wherein the annotation data comprises a combination of one-dimensional vectors respectively corresponding to the location of the traffic light, the type of the traffic light, the traffic light on/off, and the traffic signal direction of the traffic light,
    wherein the one-dimensional vector corresponding to the location of the traffic light includes each coordinate of a bounding box of the traffic light,
    wherein the one-dimensional vector corresponding to the type of the traffic light is a one-hot vector of size 4,
    wherein the one-dimensional vector corresponding to the traffic light on/off includes a one-hot vector of size 1 corresponding to all traffic lights off, a one-hot vector of size 3 corresponding to arrow lights on/off, and a multi-hot vector of size 3 corresponding to non-arrow lights on/off, and
    wherein the one-dimensional vector corresponding to the traffic signal direction of the traffic light is a multi-hot vector of size 9.

2. The system of claim 1, further comprising:
    a second processor configured to receive the image data and the traffic light data set, perform learning to infer the location of the traffic light, the type of the traffic light, the traffic light on/off, the traffic signal direction of the traffic light based on the traffic light data set and a learning condition, and infer the location of the traffic light, the type of the traffic light, the traffic light on/off, the traffic signal direction of the traffic light based on the image data and a result of the learning.

3. The system of claim 2, wherein the learning condition includes at least one of a size of the image data, data augmentation, a learning rate, momentum, weight decay, schedule, epoch, a batch size, and an evaluation cycle.

4. The system of claim 2, wherein the learning condition is changed according to a collection environment of the image data, a size of the traffic light data set, and performance of the camera.

5. The system of claim 2, wherein the performing of learning to infer the location of the traffic light includes recognizing the location of the traffic light indicated in the traffic light data set, predicting the location of the traffic light, and calculating an Intersection Over Union (IOU) loss based on a result of the recognition and a result of the prediction.

6. The system of claim 2, wherein the performing of learning to infer the location of the traffic light, the type of the traffic light, the traffic light on/off, the traffic signal direction of the traffic light includes calculating an actual probability distribution for the location of the traffic light, the type of the traffic light, the traffic light on/off, the traffic signal direction of the traffic light, predicting a probability distribution for the location of the traffic light, the type of the traffic light, the traffic light on/off, the traffic signal direction of the traffic light, and calculating a Binary Cross Entropy (BCE) loss based on a result of calculation and a result of prediction.

7. The system of claim 2, wherein the performing of learning to infer the location of the traffic light, the type of the traffic light, the traffic light on/off, the traffic signal direction of the traffic light includes generating two or more traffic light status vectors based on information about the traffic light, the type of the traffic light, the traffic light on/off, the traffic signal direction of the traffic light, and
    wherein each of the two or more traffic light status vectors includes bits indicating the type of the traffic light, the traffic light on/off, the traffic signal direction of the traffic light.

8. The system of claim 1, wherein elements of the one-hot vector of size 4 corresponding to the type of the traffic light represents car, pedestrian, bike, and bus, respectively.

9. The system of claim 1, wherein element of the one-hot vector size of 1 corresponding to all traffic lights off represents no-sign,
    wherein elements of the one-hot vector of size 3 corresponding to arrow lights on/off represent arrow-green, arrow-yellow, and arrow-red, respectively, and wherein elements of the multi-hot vector of size 3 corresponding to non-arrow lights on/off represent other-green, other-yellow, and other-red, respectively.

10. The system of claim 1, wherein elements of the multi-hot vector of size 9 corresponding to the traffic signal direction of the traffic light represent up, down, left, right, north-west, north-east, south-west, south-east, and U-turn, respectively.

11. The system of claim 1, wherein the traffic light data set includes a plurality of data sets including one annotation data per traffic light image data.

12. A traffic light recognition model learning and inference method including a data collection platform and a first processor, the method comprising:
- collecting, by the data collection platform including a camera, image data;
- sampling, by the first processor, traffic light image data including a traffic light among the image data;
- generating, by the first processor, annotation data based on the traffic light image data; and
- generating, by the first processor, a traffic light data set by using the traffic light image data and the annotation data,
- wherein the traffic light data set includes information on a location of the traffic light, a type of the traffic light, whether the traffic light is turned on, and the traffic signal direction of the traffic light,
- wherein the annotation data comprises a combination of one-dimensional vectors respectively corresponding to the location of the traffic light, the type of the traffic light, the traffic light on/off, and the traffic signal direction of the traffic light,
- wherein the one-dimensional vector corresponding to the location of the traffic light includes each coordinate of a bounding box of the traffic light,
- wherein the one-dimensional vector corresponding to the type of the traffic light is a one-hot vector of size 4,
- wherein the one-dimensional vector corresponding to the traffic light on/off includes a one-hot vector of size 1 corresponding to all traffic lights off, a one-hot vector of size 3 corresponding to arrow lights on/off, and a multi-hot vector of size 3 corresponding to non-arrow lights on/off, and
- wherein the one-dimensional vector corresponding to the traffic signal direction of the traffic light is a multi-hot vector of size 9.

13. The method of claim 12, further comprising:
- receiving, by a second processor, the image data and the traffic light data set, and performing learning to infer the location of the traffic light, the type of the traffic light, the traffic light on/off, the traffic signal direction of the traffic light based on the traffic light data set and a learning condition; and
- performing, by the second processor, learning to infer the location of the traffic light, the type of the traffic light, the traffic light on/off, the traffic signal direction of the traffic light based on a result of the learning and the image data.

14. The method of claim 13, wherein the learning condition includes at least one of a size of the image data, data augmentation, a learning rate, momentum, weight decay, schedule, epoch, a batch size, and an evaluation cycle.

15. The method of claim 13, wherein the learning condition is changed according to a collection environment of the image data, a size of the traffic light data set, and performance of the camera.

16. The method of claim 13, wherein the performing of learning to infer the location of the traffic light includes recognizing the location of the traffic light indicated in the traffic light data set, predicting the location of the traffic light, and calculating an Intersection Over Union (IOU) loss based on a result of the recognition and a result of the prediction.

17. The method of claim 13, wherein the performing of learning to infer the location of the traffic light, the type of the traffic light, the traffic light on/off, the traffic signal direction of the traffic light includes calculating an actual probability distribution for the location of the traffic light, the type of the traffic light, the traffic light on/off, the traffic signal direction of the traffic light, predicting a probability distribution for the location of the traffic light, the type of the traffic light, the traffic light on/off, the traffic signal direction of the traffic light, and calculating a Binary Cross Entropy (BCE) loss based on a result of calculation and a result of prediction.

18. The method of claim 13, wherein the performing of learning to infer the location of the traffic light, the type of the traffic light, the traffic light on/off, the traffic signal direction of the traffic light includes generating two or more traffic light status vectors based on information about the traffic light, the type of the traffic light, the traffic light on/off, the traffic signal direction of the traffic light, and
- wherein each of the two or more traffic light status vectors includes bits indicating the type of the traffic light, the traffic light on/off, the traffic signal direction of the traffic light.

19. The method of claim 13, wherein elements of the one-hot vector of size 4 corresponding to the type of the traffic light represents car, pedestrian, bike, and bus, respectively,
- wherein element of the one-hot vector size of 1 corresponding to all traffic lights off represents no-sign,
- wherein elements of the one-hot vector of size 3 corresponding to arrow lights on/off represent arrow-green, arrow-yellow, and arrow-red, respectively,
- wherein elements of the multi-hot vector of size 3 corresponding to non-arrow lights on/off represent other-green, other-yellow, and other-red, respectively, and
- wherein elements of the multi-hot vector of size 9 corresponding to the traffic signal direction of the traffic light represent up, down, left, right, north-west, north-east, south-west, south-east, and U-turn, respectively.

20. The method of claim 12, wherein the traffic light data set includes a plurality of data sets including one annotation data per traffic light image data.

* * * * *